W. Deltour.
Pulp Digester.
Nº 45,791. Patented Jan. 3, 1865.

Witnesses.
Lemuel W. Serrell
Thos. Geo. Harold

Inventor.
William Deltour

UNITED STATES PATENT OFFICE.

WILLIAM DELTOUR, OF NEW YORK, N. Y., ASSIGNOR TO HIMSELF, CHARLES W. BAKER, JAMES M. SHEEHAN, MICHAEL TOOMEY, LAWRENCE R. FITZGERALD, AND JAMES T. DERRICKSON, OF SAME PLACE.

IMPROVEMENT IN THE MANUFACTURE OF PAPER-STOCK.

Specification forming part of Letters Patent No. 45,791, dated January 3, 1865.

*To all whom it may concern:*

Be it known that I, WILLIAM DELTOUR, of the city and State of New York, have invented and made a certain new Improvement in the Manufacture of Paper-Stock; and I do hereby declare the following to be a full, clear, and exact description of my said invention, reference being had to the annexed drawings, making part of this specification, wherein—

Figure 1:
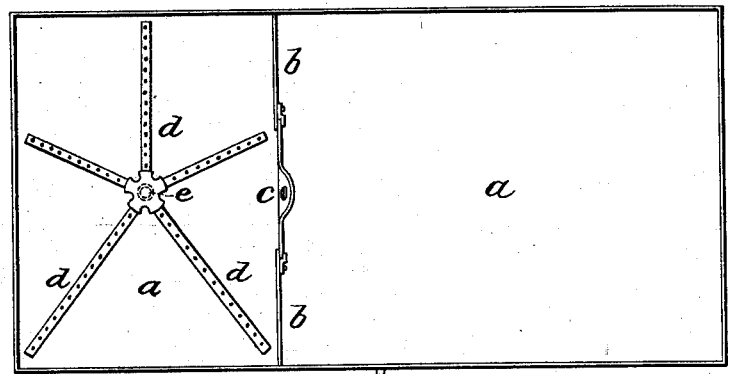
Figure 2:
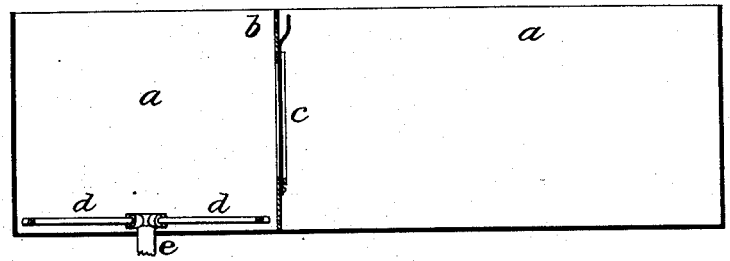
Figure 3:
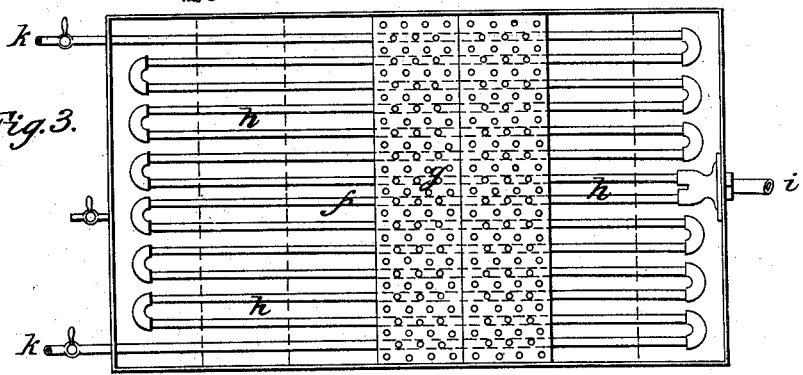
Figure 4:
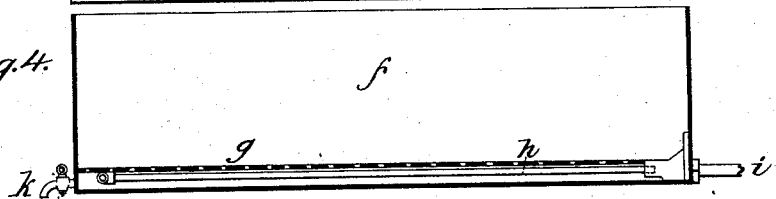
Figure 5:
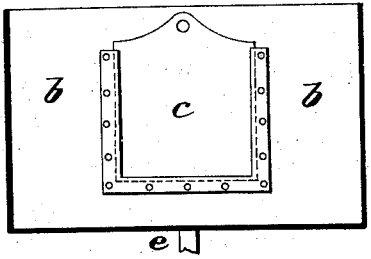

Figure 1 is a plan of my tank for preparing an alkaline solution used by me in the preparation of vegetable fiber for paper-stock. Fig. 2 is a vertical longitudinal section of said vat or tank. Fig. 3 is a plan, and Fig. 4 is a section, of a vat employed by me for boiling such vegetable fiber in the alkaline solution; and Fig. 5 is a section crosswise of the tank shown in Figs. 1 and 2.

Similar marks of reference denote the same parts.

The nature of my said invention consists in two tanks or vats, peculiarly constructed, and applied, first, to the preparation of a caustic alkaline solution; and, second, to the boiling of vegetable fiber in that solution, and preparing the said vegetable fiber for being beaten or ground in a pulp or other engine into paper-stock.

In the drawings, $a$ is a tank, in which is a partition, $b$, provided with a gate, $c$, that can be opened at pleasure. In the smaller portion of the vat or tank that is separated by the partition $b$ is a series of perforated steam-pipes, $d$, which radiate from a central pipe, $e$. Into this portion of the tank I introduce soda-ash, quicklime, and water to make a caustic alkaline solution of about 4° of strength by the ordinary alkalimeter or soap-boiler's glass. To more quickly prepare this solution, I admit steam through the pipes $d\ e$, which, blowing out into the liquid contents of the vat, heats the mass as well as agitates the same, so that the alkaline solution is obtained quickly and of the requisite gravity. The charges, when thus prepared, are successively allowed to run into the larger portion of this vat or tank $a$ by raising the gate $c$ in the partition $b$. It is to be understood that about equal proportions of soda ash and quicklime are introduced with the water, and the caustic alkaline solution thus produced by boiling is to be from 2° to 4° of gravity, according to the character of the vegetable material to be operated on for the preparation of paper-stock. From this tank or vat $a$ the alkaline solution is run or pumped into a second tank or vat, $f$, to operate on the vegetable fibrous material to disintegrate the same and remove silicious, gummy, and other substances, so that the fiber will be adapted to the washing, beating, or other separating operations now usual. The tank $f$ is made with a false perforated bottom, $g$, that, for convenience, may be made in several sections, and beneath this perforated bottom steam-pipes $h$ are provided, so that the steam, entering at $i$ and passing off at $k\ k$, shall heat or boil the contents of the vat.

It will be best with some characters of fibrous vegetable material to subject the same to the compressing action of weighted rollers, to break up any knots or hard portions previous to the mass being subjected to a boiling operation in a caustic alkaline solution in the vat or tank $f$, which caustic alkaline solution, prepared as aforesaid, softens, removes, and destroys the silex and other foreign substances that hold the fibers together much more quickly and thoroughly than the alkaline solutions heretofore employed, so that such fibers can be easily and thoroughly separated by any ordinary washing or pulping engines, and the strength of the fiber is not impaired.

What I claim, and desire to secure by Letters Patent, is—

1. The tank $a$, partitioned off at $b$, and provided with the perforated steam pipes $d\ e$, for the purposes and as specified.

2. Boiling the vegetable fiber in the vegetable caustic alkaline solution, when said vegetable material is sustained by a perforated bottom above heating-pipes, as set forth.

3. The treatment of vegetable fiber by an alkaline solution prepared in the manner and of the materials set forth.

In witness whereof I have hereunto set my signature this 1st day of December, 1864.

WILLIAM DELTOUR.

Witnesses:
LEMUEL W. SERRELL,
THOS. GEO. HAROLD.